Dec. 2, 1952   M. B. McKEE ET AL   2,619,917
FREIGHT HANDLING APPARATUS
Filed April 17, 1947   6 Sheets-Sheet 1
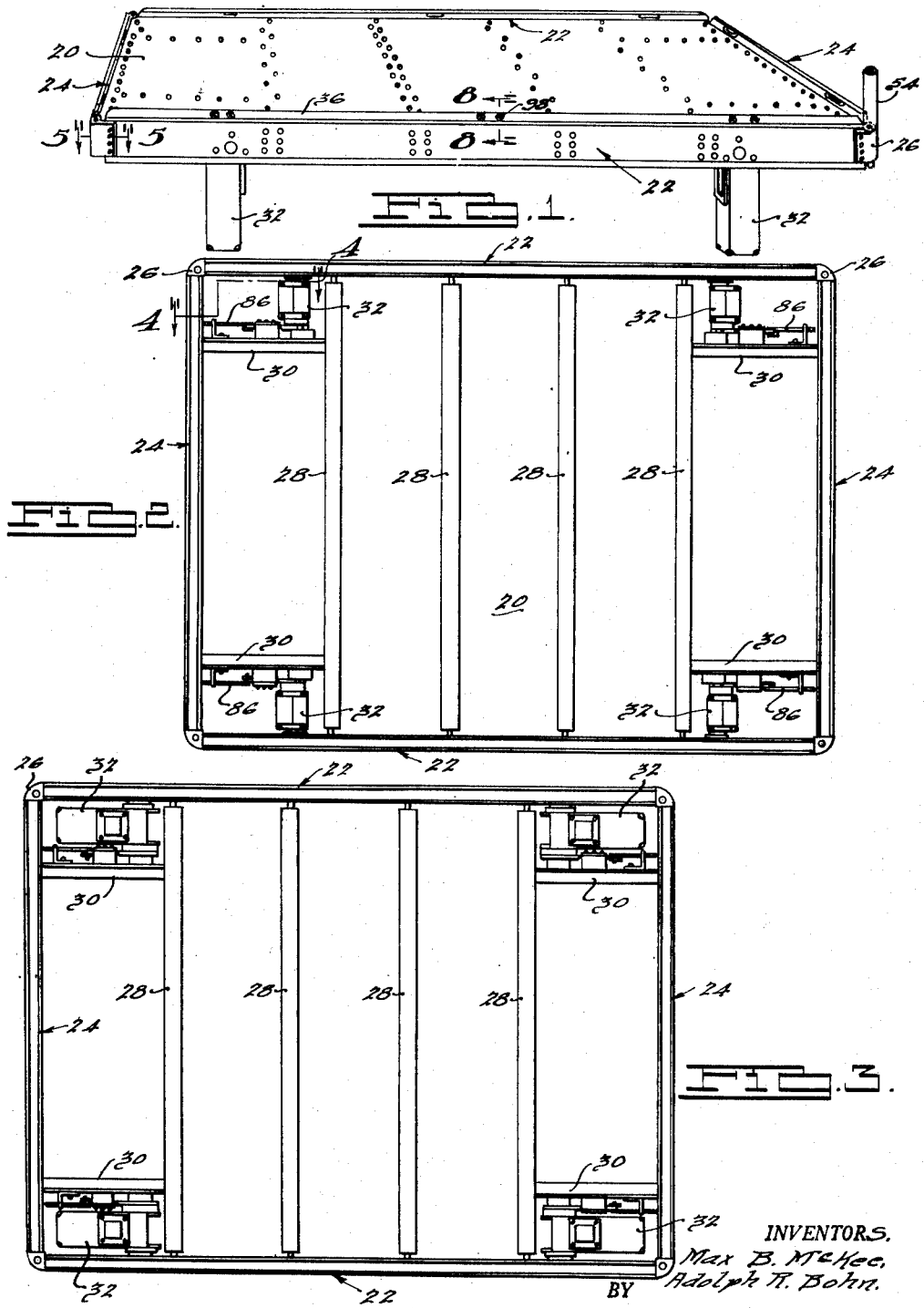
INVENTORS.
Max B. McKee,
Adolph R. Bohn.
BY Harness, Dickey & Pierce
ATTORNEYS.

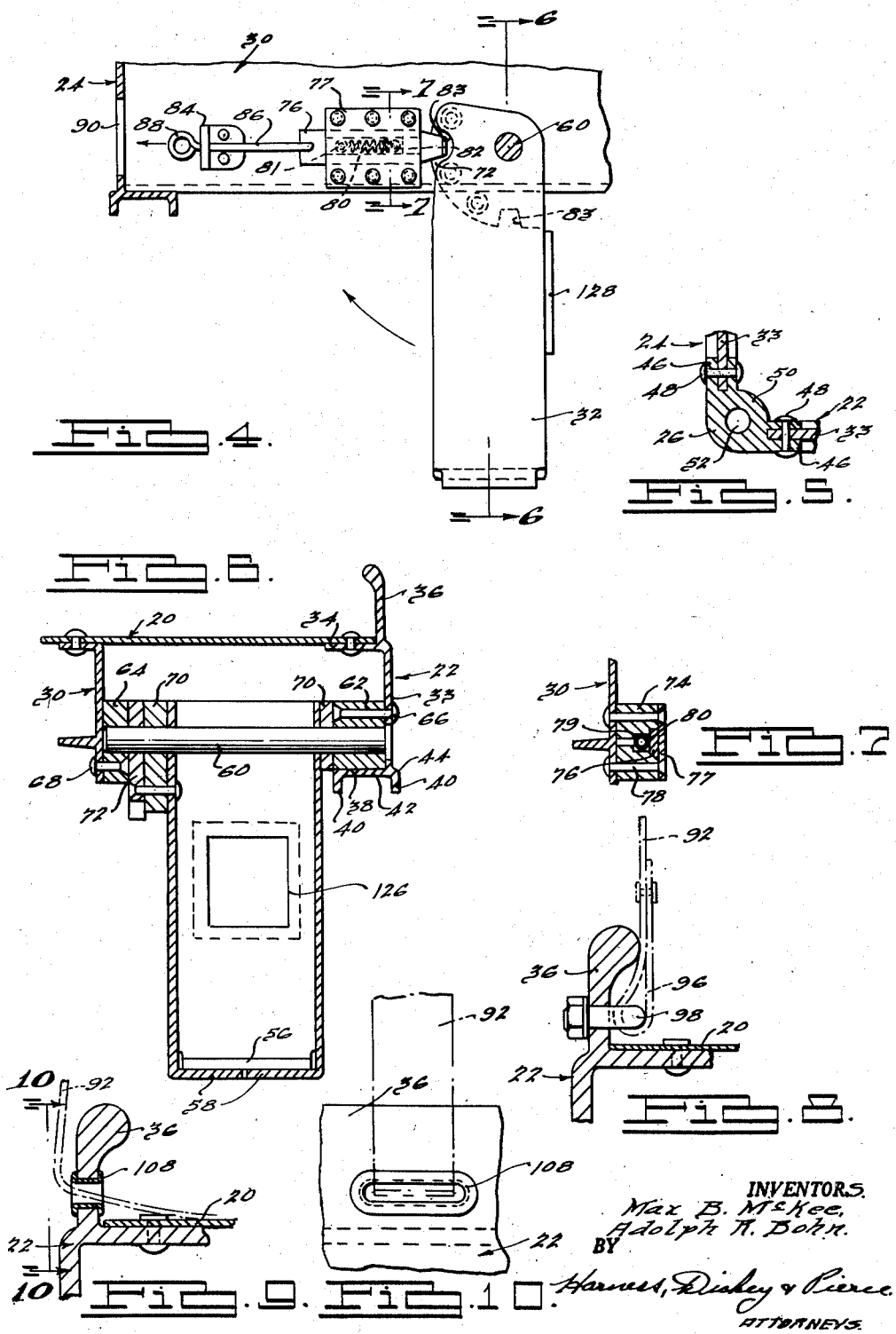

INVENTORS.
Max B. McKee,
Adolph R. Bohn.
BY Harness, Dickey & Pierce
ATTORNEYS.

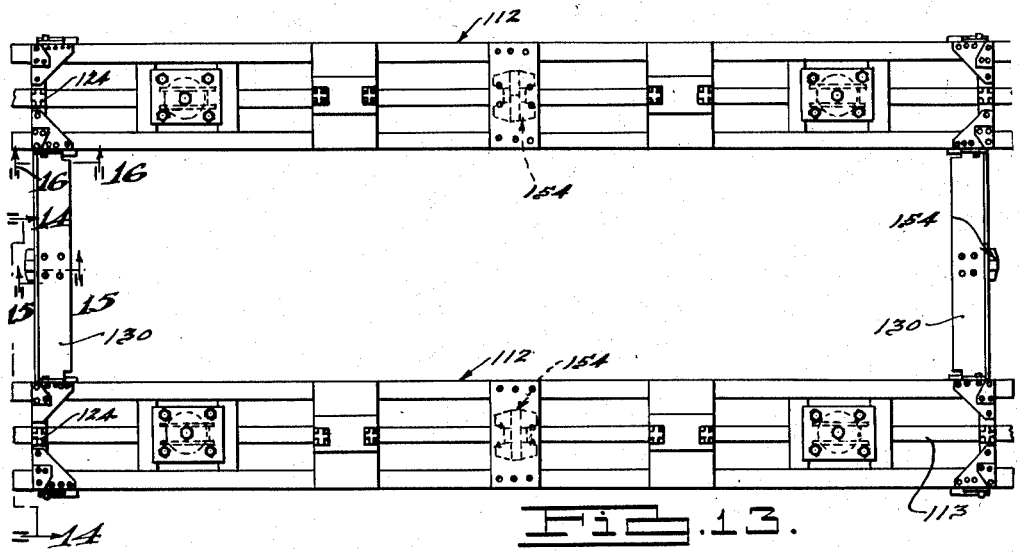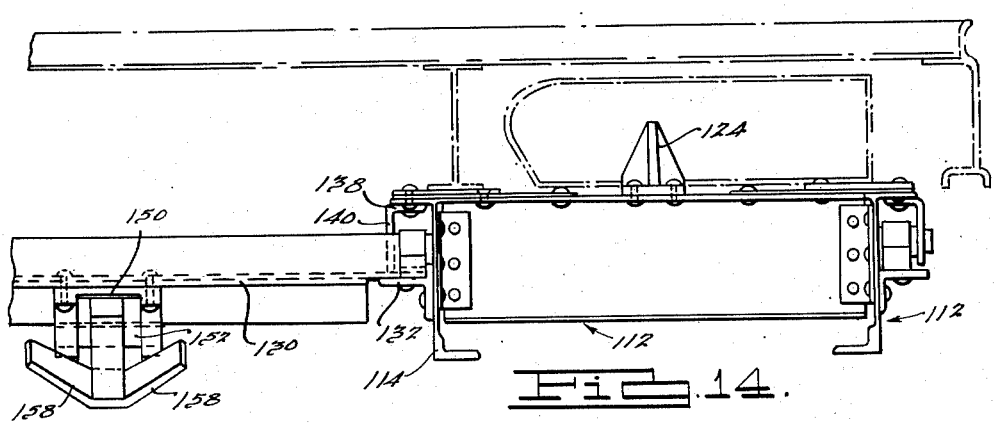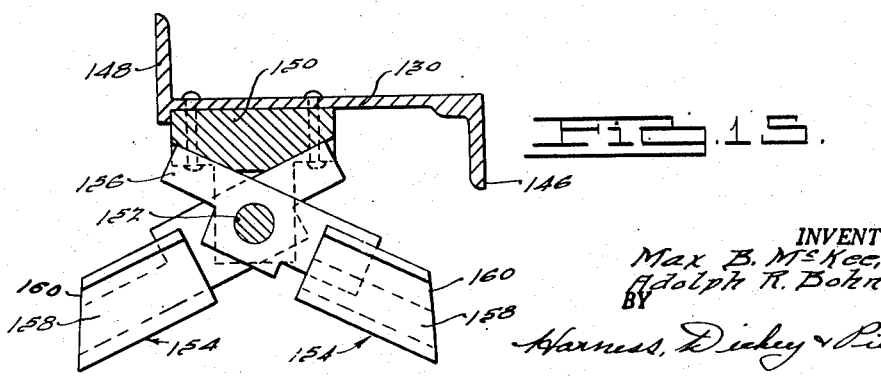

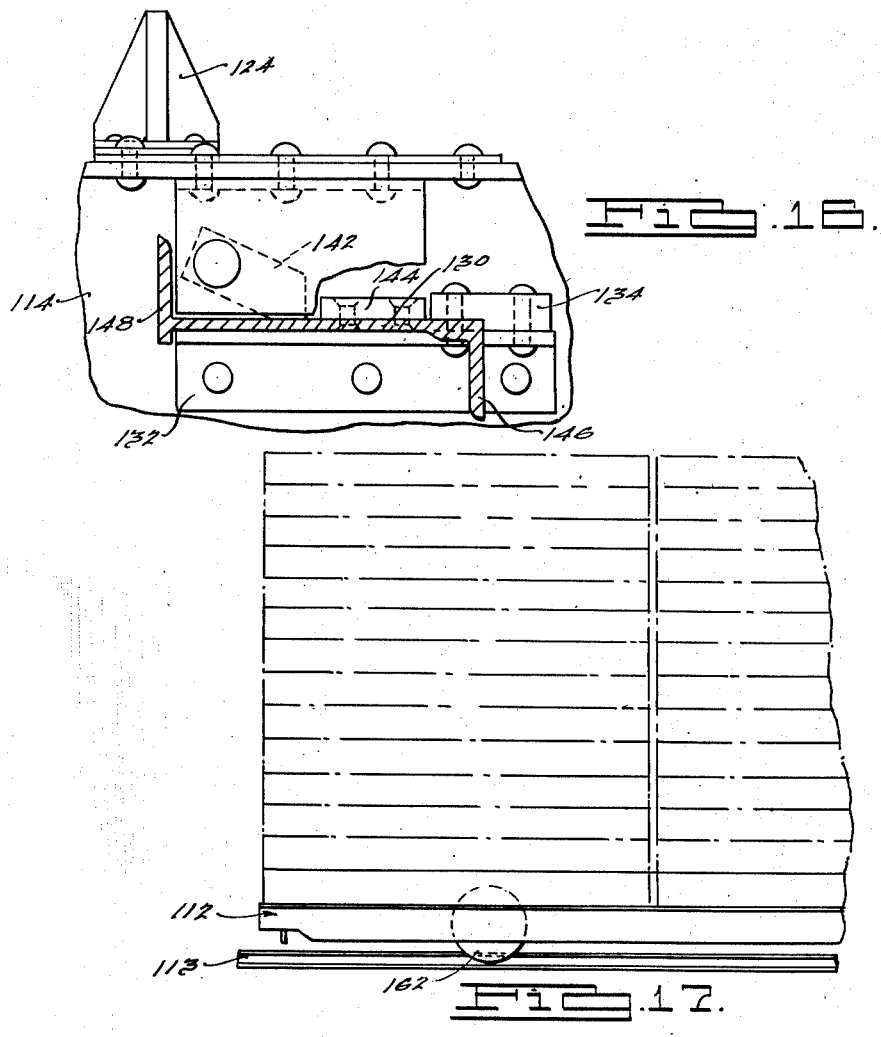
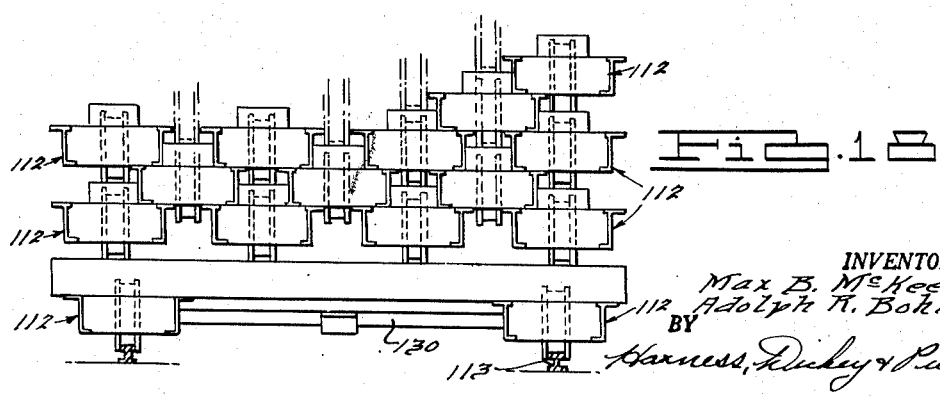

Dec. 2, 1952
M. B. McKEE ET AL
2,619,917
FREIGHT HANDLING APPARATUS
Filed April 17, 1947
6 Sheets-Sheet 6
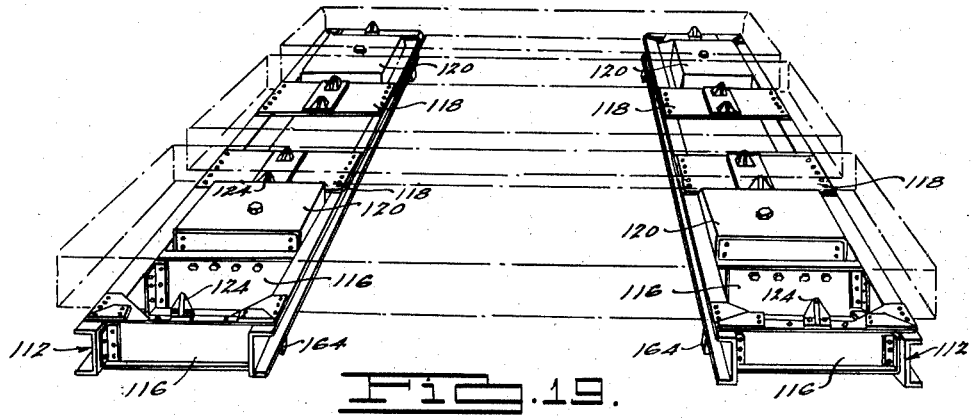
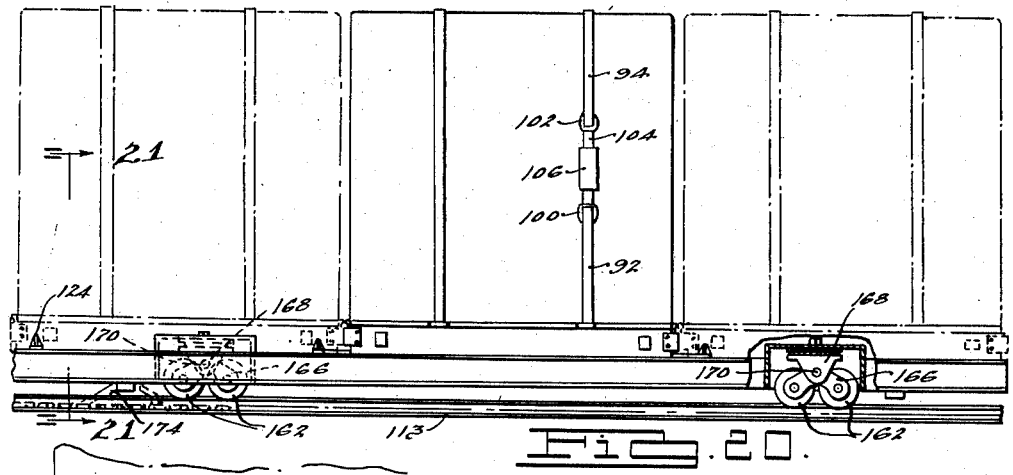
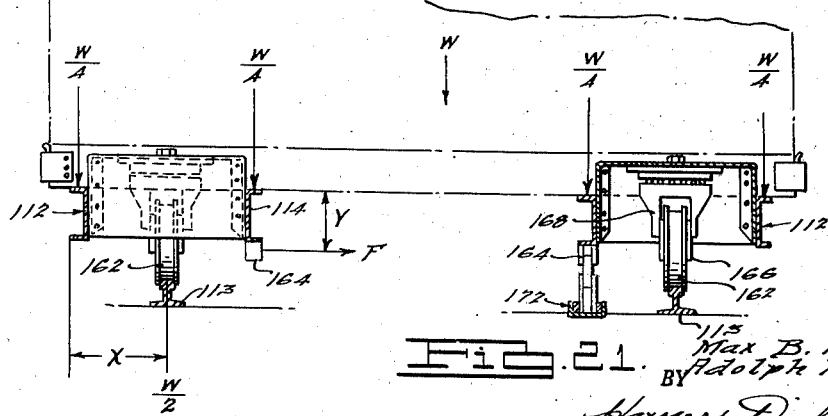
INVENTORS.
Max B. McKee.
BY Adolph R. Bohn.
Barnes, Kisselle & Pierce.
ATTORNEYS.

Patented Dec. 2, 1952

2,619,917

UNITED STATES PATENT OFFICE 2,619,917

FREIGHT HANDLING APPARATUS

Max B. McKee and Adolph R. Bohn, Detroit, Mich.; said Bohn assignor to said McKee Application April 17, 1947, Serial No. 742,172

24 Claims. (Cl. 104—172)

This invention relates broadly to new and useful improvements in freight handling apparatus.

The apparatus forming the subject matter of this application comprises several (preferably three) cradles or pallets removably mounted on a wheeled carriage. Both the cradles and the carriage are uniquely fashioned and collectively provide a novel piece of equipment for effecting rapid and efficient movement of freight.

According to this system a predetermined volume of packaged freight is fastened securely on each cradle and each of the loaded cradles comprises a unit freight load. Moreover, the cradles are dimensioned and the goods stacked thereon in such manner that the unit economically utilizes the available storage space in all of the conventional types of transport. In general, in handling miscellaneous freight, the unit load will be approximately 7 feet 6 inches long, 5 feet 6 inches wide, 5 feet 8 inches high and will weigh approximately five tons. Manifestly, however, there is nothing critical about either the dimensions or the weight; convenience of accommodation on standard types of transport determines the dimension and the weight obviously will vary somewhat depending upon the nature of the goods.

It is contemplated that each unit load will make the entire journey from consignor to consignee. However, the loaded cradles may make the entire journey mounted on the carriages or they may make only a portion or portions of the journey on the carriages and the other portion or portions of the journey separate therefrom. In general, however, it is contemplated that the cradles be used together with the carriages only when the goods are traveling by ship and at terminals or interchange points where they are loaded on or unloaded from the ship. When used in this manner, the carriages comprise a part of the ship's equipment and do not leave the marine terminals. Cradles on the other hand are common carriers and move beyond the ship terminals.

The following is a typical example of the type of operation for which the apparatus is primarily adapted. The cradles are loaded in the manner hereinabove described at the consignor's plant, each with goods for a single destination or consignee. As suggested, the goods are strapped securely in place on the cradle and are not disturbed until they reach their final destination. The cradles are then loaded into a highway trailer or freight car. Three or four cradles make a full load for a highway trailer while seven to nine cradles can be accommodated in a freight car.

Each cradle is equipped with retractable legs, which in the extended position support the cradle platform a sufficient height above the floor so that it can be picked up from either side or end by a standard platform lift truck and moved about in the plant or warehouse or on to highway trailer or railway freight car. The cradle may also be lifted by the four corners and handled by overhead hoisting devices. Thus a highway trailer or freight car can be loaded or unloaded with cradled goods in a matter of minutes, rather than hours, in the manner described.

If a portion of the journey is by water, the loaded cradles are transported to the marine terminal. In the process of unloading them from truck or freight car, the cradles are picked up by overhead hoist or platform lift truck, the legs are retracted, and the cradles are placed upon the wheeled carriages hereinabove referred to. Retracting the cradle legs permits the use of a low slung wheeled carriage and saves space in the ship. Other advantages of having the cradle legs retractable will be hereinafter demonstrated. The loaded carriages then move on rails into a warehouse where they remain until ready to be shipped. In any event the carriages, each with its group of three loaded cradles, eventually are moved into the hold of a ship. In this manner the entire cargo is mobilized on carriages at the time it is unloaded from the trailer or freight car and the entire operation of loading the ship is accomplished merely by pushing the carriages which roll on their own wheels along the dock and onto the ship. It is contemplated that the ship be provided with tracks to guide the carriages onto the several decks and into its respective storage bay on the deck.

As suggested, the present invention is primarily concerned with the unique construction of the cradles and carriages and with the manner in which the cradles and carriages are combined and correlated to achieve the above operations. The cradles are readily demountable from the carriages and both can be stacked into compact, stable piles for return shipment. Thus, strapped empties can be sent back and forth in the same manner as packaged freight. As a result, unbalanced movement of freight producing excess empty carriages or cradles going one way or accumulating at one of the marine terminals are thus economically handled or stored.

In view of the foregoing it will be readily apparent that the apparatus embodying the instant invention is adapted to mechanize the handling of freight whereby to facilitate and expedite traffic in general and particularly through ship or marine terminals. In theory, shipping by water offers economy to a degree unapproximated by any other form of transportation; however, in recent times the cost of loading and unloading ships has increased to a point where it becomes prohibitive. As a result, the package freight volume has steadily declined and in many instances marine transportation is no longer able to compete satisfactorily with other types of carriers. At the present time, cargo is handled in the same manner as in the days of the sailing ship. At the dock, freight is loaded or unloaded manually by stevedores who may require half a day to load or unload a freight car and many days to load or unload a ship. Cargo handling is by far the major item in the cost of operating a ship.

The primary object of the invention is to sharply reduce shipping costs by employing novel loading and transporting apparatus and by rapid handling through efficient use of equipment. By using apparatus embodying this invention, ships may be loaded in a matter of hours instead of days thus reducing the time a ship must remain in dock and giving railroad cars and highway trailers fast dispatch at the terminals.

Other objects of the invention are to:

Handle freight mechanically in volume units which travel from the shipper to the consignee without rehandling or breaking bulk.

Provide a cradle for carrying a unit freight load which cradle is durable, light in weight, readily mobile, and capable of low-cost production.

Provide a cradle of the above-mentioned character that is adaptable for use in all types of carriers.

Provide a cradle of the above-mentioned character having unique means for fastening the load thereon.

Provide a cradle that is adaptable to all types of conventional freight-handling equipment.

Provide a cradle that is uniquely formed so that a plurality of them can be stacked together when empty for return shipment and when so stacked form an interlocking assembly which fully utilizes shipping space and cannot be easily toppled.

Provide a carriage that is adapted to receive and transport a plurality of loaded cradles and at the same time is durable, light in weight, and capable of relatively low-cost production.

Provide a carriage of the above-mentioned character that can be knocked down or disassembled and stored in a space less than that required when in use whereby to economize in shipping space when the carriages are returned empty.

Provide a carriage of the above-mentioned character that supports the cradle as low as possible to conserve shipping space but sufficiently high to permit use of standard platform lift truck equipment for loading or unloading the cradles.

Provide a novel interlocking means for removably fastening the cradles to the carriage.

Provide a novel means for adapting the carriage for mechanized movement or propulsion.

Other objects and advantages of the invention will be apparent during the course of the following description.

In the drawings forming a part of this specification and wherein like numerals are employed to designate like parts throughout the same;

Fig. 1 is a perspective view of a cradle embodying the invention and showing the legs extended, Fig. 2 is a bottom plan view thereof, Fig. 3 is a view similar to Fig. 2 but showing the legs retracted, Fig. 4 is an enlarged, fragmentary, vertical sectional view taken on the line 4—4 of Fig. 2, Fig. 5 is an enlarged, fragmentary, transverse sectional view taken on the line 5—5 of Fig. 1, Fig. 6 is a fragmentary, vertical sectional view taken on the line 6—6 of Fig. 4, Fig. 7 is a fragmentary, vertical sectional view taken on the line 7—7 of Fig. 4, Fig. 8 is an enlarged, fragmentary, vertical sectional view taken on the line 8—8 of Fig. 1, showing a preferred means for fastening a load on the cradle, Fig. 9 is a view similar to Fig. 8 but showing modified means for fastening a load on the cradle, Fig. 10 is a fragmentary elevational view looking in the direction of the arrows 10—10 in Fig. 9;

Fig. 13 is a top plan view of the carriage,

Figure 11:
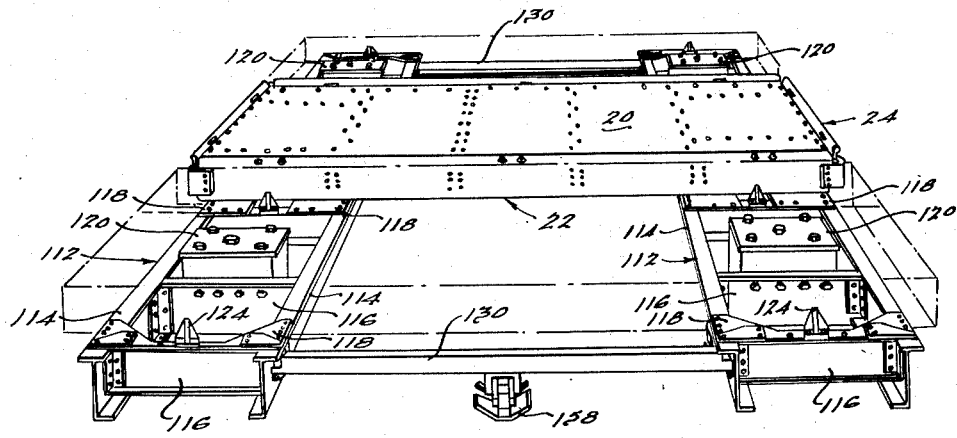
Fig. 11 is a perspective view showing empty cradles mounted on a carriage embodying a part of the invention.

Fig. 14 is an enlarged, fragmentary elevational view looking in the direction of the arrows 14—14 in Fig. 13 and illustrating the manner in which the cradles are removably interlocked with the carriage, Fig. 15 is an enlarged, vertical sectional view taken on the line 15—15 of Fig. 13, Fig. 16 is an enlarged, fragmentary, vertical sectional view taken on the line 16—16 of Fig. 13, Fig. 17 is a fragmentary, side elevational view illustrating the manner in which a plurality of empty cradles can be stacked in nested relation on an empty cradle-carriage assembly for return shipment, Fig. 18 is a fragmentary, end elevational view illustrating the manner in which a plurality of knocked-down or disassembled carriages can be stacked on an empty cradle-carriage assembly for return shipment, Fig. 19 is a perspective view similar to Fig. 11 showing a modified carriage-cradle assembly;

Fig. 20 is a side elevational view of the modified assembly shown in Fig. 19, and Fig. 21 is a fragmentary, vertical sectional view taken on the line 21—21 of Fig. 20.

For a detailed description of the apparatus reference is had to the accompanying drawings which show preferred embodiments thereof.

As best shown in Figs. 1–10, the cradle comprises a generally rectangular bottom panel or sheet 20 which is riveted or otherwise fastened to a supporting framework having laterally spaced, parallel side members 22 and transverse end members 24 rigidly connected by corner members 26. Disposed between side members 22 and arranged parallel to end members 24 are cross braces 28. The latter are securely fastened to the bottom 20 and side members 22 so that they structurally reinforce the outer members of the frame and provide internal supports for the bottom. Arranged parallel to side members 22 at the corners of the frame between end members 24 and the adjacent cross braces 28 are relatively short structural members 30 which provide inboard supports for the pivoted legs 32.

All the above parts preferably are made from a suitable light-weight metal or the like. The bottom 20 and legs 32 conveniently can be made from sheet metal and the various frame members preferably are made from extruded stock of suitable cross-sectional size and shape.

Side and end members 22 and 24 are identical in cross-sectional size and shape, and attention is now directed to Fig. 6 which shows one of the side members in transverse section. It will be observed that this member is generally channel-shaped and arranged under the bottom 20 with the web portion 33 disposed vertically thereto and the top flange 34 supporting the outer marginal portion thereof. Flange 34 is formed with an integral, upstanding tongue 36 which extends longitudinally thereof and is disposed laterally of the bottom 20. Formed integrally on the bottom flange 38 is a pair of laterally spaced, depending tongues 40 which extend longitudinally therealong and are arranged vertically out of alignment with and at opposite sides of the upstanding tongue 36. Thus, the depending flanges 40 define a downwardly opening, longitudinal groove 42 and the latter is located to receive the upstanding flange 36 of a second cradle when a number of them are stacked one upon the other. Also, it will be observed that when the cradles are stacked in this manner, flanges 36 and grooves 42 interlock to prevent lateral displacement of cradles in the stack and insure a stable assembly than cannot be easily toppled.

Another feature of particular significance is the manner in which the outermost depending flange 40 is offset outwardly from web 33 (Fig. 6). By reason of this relationship, an outward swell 44 is produced longitudinally along the frame member at the juncture of web 33 and tongue 40. Thus, not only do the outermost flanges 40 contribute to interlocking of the stacked cradles, but they also form bumpers along the cradle frames which protect the various parts of the cradles as well as goods loaded thereon from damage by impacts with freight handling and loading equipment or other objects with which they may be brought into violent contact. In this connection it will be observed that by reason of the outward, longitudinal swell 44, a relatively massive section of metal is provided at the base of tongue 40 and this fact, together with the fact that the swell is located substantially in alignment with the lower flange 38, assures great strength and rigidity.

All four corner members 26 are identical and each has right-angularly disposed slotted flanges 46 which interfit with the web portions 33 of adjacent side and end members 22 and 24 (Fig. 5). Any suitable means, such as rivets 48, can be employed to fasten corner members 26 solidly to these frame members. Also, it will be observed that corner members 26 have relatively massive middle portions 50 and that the latter are provided with openings 52 which extend entirely therethrough. These openings 52 serve a double function in that they provide sockets for conventional removable corner posts 54 (Fig. 1) and also provide catches for the hooks of a conventional freight sling or hoist (not shown).

Thus, corner members 26 provide a strong and rigid supporting frame for the cradle. At the same time, they assure a simple mechanical construction and contribute substantially to maintaining the weight of the cradle at a minimum by also serving as supports for mounting corner posts or as catch members for the hooks of a freight sling. All of these factors are of considerable importance since the cradles are adapted to be used over and over again. Lightness of weight is particularly important, since freight charges must be paid for the cradles as well as the freight carried thereby. Moreover, it is desirable that the cradles be light in weight so that they can be handled manually when stacked for return shipment. Apart from using a light weight metal these objects can be achieved in no better way than by making a few parts serve the purpose of many.

The four legs 32 are identical and each is generally in the form of an elongated hollow body (Fig. 6). By forming the legs in this manner, lightness in weight is achieved. At the same time, the legs will support a relatively great weight. The lower end of each leg 32 is closed by overlapping pairs of flaps 56 and 58. The flaps in each pair are arranged in abutting relation to assure transverse rigidity of the side walls and the lower pairs of flaps are arranged substantially at right angles so that the inner pair of flaps reinforces and strengthens the outer pair. Also, by reason of this flap arrangement, no part of the leg has edgewise engagement with the supporting surface. Consequently, the leg does not tend to embed itself in a soft surface nor will it scratch or otherwise mar a finished floor. Also, the inturned outermost flaps 58 provide a somewhat rounded undersurface for the leg which guides it easily over obstructions.

Extending transversely through the upper end of each leg 32 is a pivot 60 which is secured against rotation by projecting terminal portions thereof which are fixed in bearings 62 and 64 fastened to frame members 22 and 30 respectively. As shown in Fig. 6, the outboard bearing 62 is fastened solidly to the web 33 by rivets 66 or the like. The inboard bearing 64 is fastened solidly to frame member 30 and in horizontal alignment with bearing 62 by rivets 68 or the like. Spacers 70 are interposed between the body of the leg 32 and bearings 62 and 64, which spacers are riveted or otherwise fastened solidly to leg 32 and rotate therewith about the pivot 60.

When legs 32 are extended, as shown in Figs. 1 and 2, they hold the bottom 20 and its supporting framework elevated substantially above the supporting surface; and, when retracted as shown in Fig. 3, the legs lie wholly behind frame members 22 and 30. As suggested, the legs are retracted when the cradle is mounted on a carriage and, by mounting them so that they fit wholly within recesses defined by frame members 22, 24, 28 and 30, the cradle is supported on the carriage by its frame rather than the legs and the load is kept as low as possible.

In order to hold each leg 32 rigidly in either extended or retracted position, a notched segment 72 is interposed between the inboard bearing 64 and the adjacent spacer 70. Moreover, the segment 72 is fastened securely to the leg so that it swings with the leg about pivot 60. Fastened to the inboard support 30 between frame member 24 and leg 32 and substantially in horizontal alignment with pivot 60 is a stationary bearing block 74 which slidably supports a plunger 76. As best shown in Fig. 7, the plunger 76 is recessed into one face of the bearing block 74 and is held in position by retainer plate 77 and rivets 78. Behind plunger 76, the bearing block 74 is formed with an elongated pocket 79 which receives a compression spring 80. At its outer end spring 80 bears against a pin 81 which is embedded in bearing blocks 74 and projects into pocket 79 and at its inner end the spring bears against a pin 82 which projects into the pocket from the plunger 76. Thus, spring 80 normally urges plunger 76 against segment 72 and, as shown in Fig. 4, the latter is formed with right-angularly disposed notches 83 which interlock with the plunger when leg 32 is either fully extended or fully retracted. Fastened to and extending outwardly from plunger 76 and supported by a bracket 84 mounted on frame member 30 is an actuator arm 86. The portion of arm 86 which extends beyond bracket 84 is fashioned into a loop to provide a hand grip 88, and the latter is readily accessible for manual operation through an opening 90 provided in the web of the frame member 24.

Thus, plunger 76 can be retracted to disengage segment 72 without requiring the operator to reach under the cradle or otherwise endanger himself should the cradle inadvertently fall during raising or lowering of the leg. When released by plunger 76, the retracted leg will fall of its own weight to the extended position and when the plunger is released it enters the confronting notch 83 to hold the leg rigid (Fig. 4). On the other hand, the extended leg is retracted by disengaging plunger 76 and swinging the leg upwardly into the cradle frame, as shown by the arrow in Fig. 4. For obvious reasons this latter operation preferably is accomplished with a suitable tool rather than manually. Hand grip 88 is released as soon as leg 32 is swung from a vertical position. The inner end of plunger 76 then rides along the periphery of segment 72 as the leg swings upwardly until the other notch 83 moves into register therewith, at which time spring 80 forces the plunger into the notch to hold the leg retracted.

Figure 12:
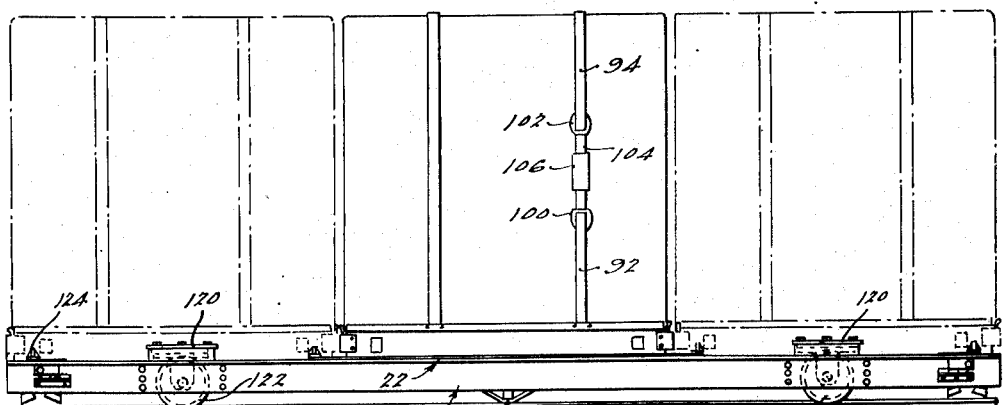
Fig. 12 is a side elevational view showing loaded cradles on the carriage.

A load may be fastened to the cradle in any desired manner, and the particular fastening means employed may vary somewhat depending on the nature of the goods and the exigencies of the particular situation. One means of fastening a load to the cradle is shown in Fig. 1. Ropes, chains or the like are wrapped around the load and fastened at the corners to posts 54 carried by corner members 26. However, in general, goods can best be fastened on the cradle by flexible tie members, as shown in Figs. 8, 9, and 12.

A preferred arrangement of tie members is shown in Fig. 8. Each tie member comprises separate permanent tie sections 92 and 94 disposed in opposed relation at opposite sides of the cradle, and each section has a looped end 96 which is solidly anchored by a U bolt 98 at the inner side of a respective tongue 36. In Fig. 1 the cradle is equipped for three transverse tie members and two longitudinal tie members. According to the instant invention tie section 92 is relatively short and tie section 94 is relatively long, so that when the two sections are thrown around the load, as shown in Fig. 12, their free ends are disposed at one side or end of the same and in aligned but spaced relation with each other. As suggested, these tie sections are permanent adjuncts of the cradle and are not cut away and discarded as in conventional practice, when the cradle is unloaded. At their free ends, tie sections 92 and 94 are provided with link fasteners 100 and 102, respectively. After the cradle has been loaded, fasteners 100 and 102 are coupled together by a short length of a suitable impermanent tie section 104. The permanent tie sections 92 and 94 conveniently may be made of webbing chain or the like. The impermanent tie section 104 preferably comprises a short steel strap that is inherently strong and flexible and can be acted upon by conventional equipment to tighten the permanent tie sections and then secured at its ends by a conventional crimp fastener 106, or the like.

The usual practice in fastening a load of this character is merely to wrap a number of steel straps around the load and then fasten the overlapping ends of the straps by crimp fasteners 106 or the like. When the goods are unloaded these metal straps are cut away and discarded. Thus, the straps are used only once and are then thrown away as scrap. When it is considered that about fifteen hundred fully loaded cradles can be shipped in a six-thousand ton vessel and that the goods on each cradle are bound by five tie members, it is obvious that the tie members alone represent considerable waste. The practice here shown of providing the cradles with permanent sections coupled by relatively short impermanent sections achieves a considerable saving in material and consequently a reduction in shipping costs.

The manner in which the permanent tie sections are fastened on the cradle also is a feature of this invention. By fastening them at the inner sides of upstanding tongues 36, they are shielded from contact with other cradles or objects which might strike them a shearing blow during handling or shipment. Moreover, the height of upstanding flanges 36 is greater than the depth of grooves 42 so that tie members 92 and 94 can be laid flatly on the bottoms of the cradles when a plurality of empty cradles are stacked for return shipment, in which position the tie members are protected by flanges 36 from contact with the cradle or cradles thereabove.

Figs. 9 and 10 show a method of applying the conventional impermanent steel strapping. The strapping is laid across the bottom from side to side or end to end of the cradle and passed through slots in upstanding tongue 36 of members 22 and 24. The goods are piled upon the bottom, over the strapping. The latter is turned up outside of the slots, passed over the load, drawn tight and fastened in the conventional manner. Grommets 108, made of steel or other wear-resisting material, protect the relatively soft light weight metal tongue 36 against the cutting action of the steel strapping as it is drawn up tightly around the load.

Attention is now directed to Figs. 11-18 which show a carriage embodying the instant invention and the manner in which it is associated with cradles of the type hereinabove described. Considered in certain of its broader aspects, the carriage comprises a pair of discrete but identically formed wheeled beams 112. These beams are long enough to accommodate three cradles side by side, and suitable means is provided for detachably interlocking the cradles and the carriages.

In effect, the cradle-carriage assembly provides freight-carrying apparatus adapted to transport freight efficiently from one marine terminal to another or in any similar capacity and capable of being maneuvered as a unit at the terminals and during loading or unloading of the ship. The interlocking means holds the cradles on the beams and locates the latter in properly spaced relation under the cradles for movement along tracks 113.

As suggested, the apparatus is adapted to be moved mechanically and substantially automatically by suitable conveyors both during movement of freight at the terminals and aboard ship. In order to accomplish this purpose, the carriage is equipped with suitable means for effecting a driven connection with the driving lugs of endless conveyors, and these means are arranged so that the carriage can be driven either longitudinally or transversely.

By reason of this unique arrangement and correlation of parts, the apparatus is exceedingly adaptable and maneuverable, and conventional platform-type lift trucks can be driven between the beams from either end thereof in a manner greatly expediting and facilitating assembly or disassembly of the heavily loaded cradles.

Since beams 112 are identical, a detailed description of one is sufficient. Each beam comprises a pair of laterally spaced and parallel, longitudinal structural members 114 rigidly fastened together by a plurality of a transverse channel member 116 and structurally reinforced by riveted corner plates 118. In proximity to each end of the beam and fastened solidly between adjacent transverse channel members 116 is a box housing 120 which accommodates and is fastened to a swivel wheel 122.

As shown in Fig. 11, the cradles are mounted with their longitudinal axes arranged transversely of the beams 112. In order to locate beams 112 under the cradles and to prevent the latter from sliding off the beams when traversing ramps or other inclined surfaces, selected transverse members 116 are provided with upstanding upwardly tapered pilot pins 124. Four pilot pins 124 are provided for each cradle and each set of pins is located directly under the retracted legs 32 of its respective cradle. The outer sides of the folded legs have openings 126 which receive and snugly fit over the base portions of the pins and since the legs 32 preferably are made of aluminum, holes 126 are reinforced by steel frames 128.

Thus, the strong, rigid under frames of the cradles support the load on the carriages, and the retracted legs 32 interlock with pilot pins 124 to detachably hold the loaded cradles on the carriage. Furthermore, since the retracted legs 32 are disposed entirely behind the supporting frames of the cradles, no leverage is imposed on the leg pivots 60 by the vertical weight of the load. When employed in this capacity, legs 32 merely provide bearing surfaces which interlock with and fit snugly around the bases of pilot pins 124.

Thus, legs 32 also serve a double function; viz. supporting the cradles when the latter are disassembled from the carriage and anchoring the cradles when they are assembled on the carriage. As a result it is unnecessary to provide additional structural parts on the cradle to interlock with the pilot pins 124. Simplicity and economy of construction are achieved, weight is maintained at a minimum and a substantial reduction in shipping cost is obtained.

In addition to the above, the unique manner in which the cradles and carriage are formed and associated with each other permits relatively large and heavy swivel wheels 122 required to support the weight of the three loaded cradles to be used in a minimum of space. In this connection it will be observed that the beams 112 are mounted low on the wheel housings 120, and that the projecting portions of the latter interfit with the supporting frames of the two end cradles. As a result, the vertical height of the load is maintained low to conserve shipping space.

In the form of the invention shown in Figs. 11–18, the means for driving the apparatus longitudinally comprises a pair of identically formed crossbars 130 arranged one at each end of the carriage (Fig. 11) and disposed between and substantially in abutting relation with the two innermost longitudinal structural members 114. The terminal portions of each crossbar 130 rest on supporting brackets 132 which are riveted or otherwise fastened to the structural members 114 (Fig. 14); and, the front edges of the supported ends abut stops 134 mounted on the brackets (Fig. 16). Manifestly, stops 134 limit inward movement of crossbars 130.

In order to hold crossbars 130 releasably fastened to beams 112 and against outward movement, structural members 114 also are provided with brackets 138 which are mounted above the crossbars and have depending flange portions 140 (Figs. 14 and 16). The latter carry pivoted latches 142 which latches are positioned to engage blocks 144 on the supported ends of crossbars 130. It will be noted that latches 142 extend inwardly and downwardly; and, when crossbars 130 are disengaged from the beams, the swinging ends thereof rest on brackets 132. To assemble the cross bars it is merely necessary to push them inwardly on brackets 132 and, as they advance, latches 142 ride easily over blocks 144 and drop into position therebehind as shown in Fig. 16. When the parts are thus positioned, stops 134 limit inward movement of the crossbars and pivoted latches 142 limit outward movement thereof. To disassemble the crossbars it is merely necessary manually to pivot the latches 142 upwardly and simultaneously withdraw the crossbars.

Formed integrally on the inner longitudinal edge of each crossbar 130 between opposed brackets 132 is a depending flange 146, and formed integrally on the outer longitudinal edge thereof is an upstanding flange 148. The latter flanges are cut back from the supported ends of the crossbars, as shown in Fig. 14, so that access may be had to pivoted latches 142; however, they preferably overlap the outer ends of brackets 138 and are so located as to abut thereagainst substantially at the same time the crossbars engage stops 134 whereby to help sustain forward thrust against the cross bars and distribute the driving load.

As shown in Fig. 14, each of the beams 112 is equipped with identical locking or latching mechanisms for crossbars 130 on both longitudinal members 114 so that the two beams are interchangeable in the carriage assembly. As a result, any two beams can be selected from a stock supply to make a carriage for the cradles, and it is immaterial whether the beams are placed at one side or the other in the assembly.

Fastened solidly to the undersurface and at substantially the middle of crossbars 130 are U-shaped brackets 150, while carried by and extending transversely between the depending arms of the brackets are pivots 152 each of which mounts a pair of oppositely extending dogs 154. Each dog is provided at one side of pivot 152 with a longitudinal extension 156 which normally extends angularly upwardly and seats against the base portion of bracket 150 to limit downward movement of the dog (Fig. 15). At the other side of pivot 152, the dogs 154 extend angularly downwardly and are provided with transverse, angularly upwardly extending over-riding wings 158. The latter are relatively heavy and hold the dogs normally positioned, as shown in Fig. 15. When thus positioned, the outer edges 160 of the dogs are disposed vertically to engage the upstanding driving lugs of an endless conveyor (not shown). By properly spacing the driving lugs on the conveyor they can be made to engage dogs 154 at opposite ends of the carriage simultaneously; and, since each cross bar 130 is equipped with two oppositely directed dogs, the apparatus can be driven in either longitudinal direction.

It will be observed that crossbars 130 do not connect or in any way fasten beams 112 together. That is the function of the cradles. The crossbar assemblies merely function to transmit motion from the driving lugs of an endless conveyor to the wheeled beams 112 and to operate the same in synchronism.

Attention is directed to the fact that the two beams 112 also are provided with driving dog assemblies 154 which are identical to those described above (Figs. 12 and 13), in order that the apparatus may be driven sideways as well as lengthwise. It may be necessary or desirable to drive or maneuver the apparatus in this manner several times when moving it about the terminal or during loading or unloading. The direction of travel of the apparatus is changed at track intersections where the conveyor driving the same longitudinally is stopped, swivel wheels 122 are turned 90° from the position shown in Fig. 12, and a conveyor chain is operated to engage the dog assemblies 154 on beams 112.

When loading or unloading cradles on the carriage, crossbars 130 are disassembled so that a conventional platform-type lift truck can pass between the two beams 112. During loading, a truck carrying a laden cradle is driven between beams 112 to position openings 126 on the cradle legs 32 directly above a set of pilot pins 124 and the cradle lowered onto the beams with the pilot pins in the openings and interlocking with the legs. The truck platform is then released from the cradle and the truck backed from between the beams. Other cradles are assembled in a like manner. After all three cradles have been loaded, crossbars 130 are added to complete the assembly and equip the apparatus for powered movement along the tracks. The laden cradles are unloaded form the carriage by reversing the above procedure.

In the event an excessive number of empties accumulate at one terminal, they are stacked together and shipped to another terminal in the manner hereinabove described. Fig. 17 illustrates the manner in which empty cradles are stacked on an empty cradle and carriage assembly for return shipment. Fig. 18 similarly illustrates the manner in which wheeled beams 112 are stacked on an empty assembly. It will be observed that the cradles are nested in interlocking engagement with each other and that the beams are stacked in staggered relation with wheels 122 resting either on the assembled cradles or on the wheel housings 120 of the subject unit. In this manner approximately fourteen cradle and carriage assemblies can be shipped back empty in the space ordinarily occupied by two loaded assemblies. By reason of the interlocking nested relation of the stacked cradles, they make an exceedingly stable pile that is not easily toppled, and the same is true of the wheel beams 112. Moreover, when the cradles and wheeled beams are arranged in this manner, the tie members of the supporting assembly can be wrapped around the stacks and fastened securely to form a stable, compact bundle.

Attention is now directed to Figs. 19–21 which show a modified carriage and cradle assembly. In the latter form of the invention the cradle may be identical to the one hereinabove described, and the carriage is the same except that dual swiveled wheels 162 are employed instead of single wheels, crossbars 130 and their connecting adjuncts are omitted, and lugs 164 are mounted directly on the wheeled beam 112 for engagement with a driving dog of a suitable endless conveyor.

The dual wheel assemblies are more or less conventional and each comprises the usual equalizing bars 166 which connect the two wheels 162 and a swiveled bracket 168, which is pivoted to the equalizing bars. Housings 120 receive the wheel assemblies in the manner and for the purpose described above, and the wheel assemblies are freely rotatable about vertical axes so that the carrier is readily maneuverable.

Lugs 164 are preferably attached to the inner longitudinal beam members 114 and conveniently may be located substantially in alignment with the transverse frame members 116 located at the outer sides of wheel housings 120. This arrangement is shown in the drawings. An endless belt conveyor designated generally by the numeral 172 and having upstanding driving dogs 174 is provided inside and parallel to one of the tracks 113. As shown in Fig. 21, the conveyor 172 is located so that driving dogs 174 are positioned to engage one of the lugs 164. Although separate conveyors may be provided for each of the wheeled beams 112, one conveyor is usually sufficient to propel a loaded cradle and carriage assembly longitudinally. Two conveyors may be necessary to move the loaded assembly sideways. However, the particular conveyor arrangement is not a part of the present invention and a detailed consideration here is unnecessary.

Certain advantages are obtained by using a single off-center conveyor of the type shown in Figs. 20 and 21, and actual tests have demonstrated that the cradle and carriage assembly can be driven in this manner without twisting, flexing or otherwise adversely affecting the same. Apparently, this mode of operation is possible because of the unique construction and correlation of the assembled parts. Each carriage beam 112 alone has little more stability than a chair balanced on two legs. However, when loaded cradles 20 are placed upon a pair of beams 112, as shown in Fig. 21, a system of forces is set up which keeps the assembly stable. If W is taken to represent the total weight of uniformly loaded cradles 20, then the weight resting on each of the four shoulders of the two beams 112 is equal to one-fourth of W and the weight supported by the medianly located wheels of each beam is equal to one-half W. The stability of each beam can be expressed as being equal to the weight supported by its wheels $$\left(\frac{W}{2}\right)$$

multiplied by the horizontal distance from the center of the wheel to the extreme edge of the shoulder (X). Therefore, the stabilizing moment increases with any increase in weight on the carriage.

Due to the magnitude of this stability it is feasible to mount lugs 164 anywhere on the underside of the carriage beams 112, or, as shown specifically in Fig. 21, on the underside of the inner longitudinal members 114. If the horizontally acting force required to drive the apparatus sidewise be designated as F and the vertical distance from this force to the top of the shoulder as Y (Fig. 21) then the upsetting moment will be equal to F multiplied by Y. To insure stability of the system it is necessary only to proportion the various components in such manner that $$\frac{W}{2}$$

times X is always greater than F times Y.

When the carriage is to be driven longitudinally by means of lugs 164, the driving force may be applied simultaneously to both beams or it may also be applied to one beam only. As suggested, the latter mode of operation is shown in the drawings (Figs. 20 and 21) and the second beam is propelled through the rigidity of the cradle frames. The interlocking of pilot pins 124 and holes 126 hereinbefore described, maintains the cradles and beams 112 in fixed relation in a horizontal plane. Thus, if the conditions specified above are maintained, no connecting members actually are required between beams 112 other than the cradles which rest upon them.

It is to be understood that the forms of the invention herewith shown and described are to be taken as preferred examples of the same and that various changes in the size, shape, and arrangement of parts can be resorted to without departing from the spirit of the invention or the scope of the appended claims.

Having thus described the invention, we claim:

1. Freight transporting apparatus comprising a pair of laterally spaced and parallel wheeled beams each including a pair of longitudinally spaced medianly located swivel wheels and a framework supported by the wheels, said framework having relatively wide shoulders at opposite sides of the wheels; at least one cradle bridging said wheeled beams and mounted thereon and with its undersurface seating flatly on said shoulders, and means detachably interconnecting said cradle and said beams, said cradle having a planar freight supporting top surface and automatically stabilized due to the central position of the wheels and the relatively wide shoulders at each side thereof, and whereby the stability increases progressively as the load on the cradle increases.

2. The combination as set forth in claim 3 wherein the interlocking means comprises upstanding pilot pins on said beams and pivoted legs folded under said cradle means, the underside of said legs provided with openings which receive and snugly fit the pilot pins, whereby to locate the cradle means on the beams and assure uniform positioning and spacing of the beams under said cradle means.

3. Freight transporting apparatus comprising laterally spaced and parallel wheeled beams; a removable cradle resting on said beams; and interlocking means connecting the beams and cradle so as to prevent relative horizontal movement therebetween but permitting said cradle to be readily lifted vertically from the beams, said cradle constituting the sole means connecting the beams to each other, whereby a lift truck or the like can pass between the beams and under said cradle from either end of the apparatus and disengage said cradle from the beams without interference from other connecting cross members.

4. Freight transporting apparatus comprising laterally spaced, parallel wheeled beams; upstanding pilot pins mounted on said beams; and a removable cradle bridging and resting on the beams, said cradle having pivoted legs folded thereunder and said folded legs provided at the undersides thereof with holes which receive and snugly fit said pilot pins.

5. Freight transporting apparatus comprising laterally spaced and parallel wheeled beams; upstanding and upwardly tapered pilot pins on said beams; a plurality of removable cradles mounted side-by-side on the beams, each of said cradles provided in its undersurface with holes positioned to receive respective pilot pins and shaped to fit snugly around the bases thereof, the parts so constructed and arranged that the pilot pins locate the cradles on the beams and interlock with the cradle openings to hold said beams in fixed spaced relation, said cradles constituting the sole connections between the beams whereby a lift truck or the like can pass between the beams from either end of the apparatus and raise the cradles to disengage them from the pilot pins without interference from other connecting cross members.

6. Freight transporting apparatus comprising a pair of laterally spaced, parallel wheeled beams; upstanding pilot pins on the beams; and a removable cradle resting on the beams, said cradle provided in its undersurface with holes positioned to receive said pilot pins, the parts so constructed and arranged that the pilot pins locate the cradle on the beams and interlock with the cradle to prevent independent lateral movement of the beams, whereby the cradle constitutes the sole connection between the beams and a lift truck or the like can raise the cradle from the beams without interference by other connecting cross members.

7. A carriage for freight transfer systems comprising a pair of laterally spaced, parallel beams; swivel wheels supporting said beams; dogs fastened to and depending from the beams for engaging the driving lugs of an endless conveyor chain traveling crosswise to the beams; and means for establishing a driven connection between the apparatus and the driving lugs of an endless conveyor chain traveling between and parallel to said beams comprising cross bars between the beams, means detachably fastening the cross bars to the beams and holding the same solidly against independent longitudinal movement, and dogs carried by and depending from said cross bars adapted to engage the driving lugs of said conveyor chain.

8. A carriage for freight transfer systems comprising a pair of parallel, wheeled beams; cross bars between said beams; means detachably fastening the cross bars to the beams and holding the same solidly against relative longitudinal movement; and driven means disposed at substantially the centers of said beams and said cross bars, each of said driven means including a pair of pivoted dogs mounted with their pivot axes transverse to the direction in which they are adapted to propel the carriage, said dogs normally hanging angularly downwardly in opposite directions and each provided with stop means for limiting downward swinging movement thereof about its pivot, and over-riding wings so constructed and arranged as to carry the dog over an obstruction encountered thereby when the carriage is moving in a direction crossways to the direction in which the dog is adapted to propel it.

9. A carriage for freight transfer systems comprising a pair of parallel wheeled beams; cross bars between said beams; means detachably fastening the cross bars to the beams and holding the same solidly against relative longitudinal movement; and dogs carried by and depending from said cross bars adapted for engagement with the driving lugs of a conveyor chain or the like, said dogs mounted for pivotal movement about horizontal axes and the depending portions thereof provided with angularly upwardly extending over-riding wings so constructed and arranged as to carry them over obstructions when the carriage is moving in a direction parallel to the axes of the dogs.

10. A carriage for freight transfer systems comprising a pair of parallel wheeled beams; cross bars between said beams; means detachably fastening the cross bars to the beams and holding the cross bars solidly against longitudinal movement relative to the beams; and dogs carried by and depending from said cross bars adapted for engagement with the driving lugs of a conveyor chain or the like.

11. A carriage for freight transfer systems comprising a pair of parallel, wheeled beams; cross bars between and with their ends substantially in abutting relation to said beams; keeper means on the ends of said cross bars; and latch means on the sides of said beams adapted to receive the ends of said cross bars and to interlock with said keeper means, said latch means being disposed at both ends of the beams whereby the latter are interchangeable in the carriage structure.

12. A carriage for freight transfer systems comprising a pair of parallel, wheeled beams; cross bars between said beams; and manually operable latch means detachably fastening the cross bars to the beams.

13. A carriage for freight transfer systems comprising a pair of discrete, parallel, wheeled beams; cross bars intermediate said beams; and latch means carried by said beams engageable with said cross bars when the latter are positioned transversely with respect to the beams and moved bodily into the space between said beams.

14. A carriage for freight transfer systems comprising a pair of discrete, parallel, wheeled beams, each including longitudinal structural members connected to and held in fixed spaced relation by a plurality of longitudinally spaced, transverse structural members, and said wheels disposed medianly between said longitudinal structural members; and removable cross bars detachably coupling said beams together.

15. A carriage for freight transfer systems comprising a pair of discrete, parallel, wheeled beams, each including longitudinal structural members connected to and held in fixed spaced relation by a plurality of longitudinally spaced, transverse structural members, and said wheels being mounted to pivot about vertical axes and disposed medianly between said longitudinal structural members.

16. A portable cradle for freight transfer systems comprising a bottom; and a supporting framework for said bottom; the latter having side, end and corner members, said side and end members provided at the top edges thereof with upstanding longitudinal tongues and at the bottom edges thereof with longitudinal grooves, said tongues and grooves so constructed and arranged that when a plurality of the cradles are stacked one upon the other the tongues and grooves interlock to hold the cradles against lateral displacement in the stack, said corner members having right angularly disposed flanges which overlap and are fastened securely to the terminal portions of said side and end members to hold the latter in rigid association with each other and formed intermediate said flanges with relatively massive inwardly extending portions, said massive portions having vertical openings which extend entirely therethrough and serve a double function in the combination of providing sockets for removable upright posts or of providing catches for the lifting hooks of a freight sling or the like.

17. A portable cradle for freight transfer systems including a bottom; and a supporting framework for the bottom, said framework having extruded side and end members arranged along the edges of the bottom, said members generally channel shaped and disposed with their web portions vertically under the bottom and with the upper flanges thereof supporting the margins of the bottom, the lower flange of each member provided with laterally spaced and depending longitudinal tongues and the outermost of said tongues being outwardly offset relative to the web to define a longitudinally extending outward swell at the juncture of the web and said tongue, said swell making the adjacent portion of the member relatively massive and rigid and providing an outwardly offset surface which forms a bumper for the cradle, the upper flange of each member provided with an upstanding longitudinal tongue positioned vertically above and between said depending tongues, whereby the upstanding tongue portions of each cradle interlock with the depending tongue portions of the adjacent cradle when a plurality of said cradles are stacked one upon the other.

18. A portable cradle for freight transfer systems including a bottom; and a supporting framework for the bottom, said framework having side and end members arranged along the edges of the bottom, said members generally channel shaped and disposed with their web portions vertically under the bottom and with the upper flanges thereof supporting the margins of the bottom, the lower flange of each member provided with laterally spaced and depending longitudinal tongues and the outermost of said tongues being outwardly offset relative to the web to define a longitudinally extending outward swell at the juncture of the web and said tongue, said swell making the adjacent portion of the member relatively massive and rigid and providing an outwardly offset surface which forms a bumper for the cradle.

19. A portable cradle for freight transfer systems including a bottom; and a supporting framework for the bottom, said framework having side and end members arranged along the edges of the bottom, said members being generally channel shaped and positioned so that the flanges extend horizontally and the upper flanges support the margins of said bottom, said lower flanges provided with depending longitudinal tongues and said upper flanges provided with upstanding longitudinal tongues, said depending and upstanding tongues laterally offset with respect to each other so that the upstanding tongues of one cradle interlock with the depending tongue of a subjacent cradle when a plurality of said cradles are stacked one upon the other.

20. A portable cradle for freight transfer systems comprising a bottom; and a supporting framework for the bottom, said framework having side and end members arranged at the edges of the bottom, upstanding longitudinal tongues integrally formed on the top edges of said frame members and laterally of said bottom, and depending longitudinal tongues formed integrally on the bottom edges of said members, said depending tongues disposed vertically out of alignment with said upstanding tongues, whereby when a plurality of the cradles are stacked one upon the other and with the frame members substantially in vertical alignment the upstanding and depending tongue portions thereof interlock to prevent relative lateral movement of the cradles.

21. A portable cradle for freight transfer systems comprising a bottom; and a supporting framework for the bottom, said framework having side and end members provided at the bottom edges thereof with longitudinal grooves and at the top edges thereof with upstanding longitudinal tongues, each of the latter located directly above the groove in its respective member and extending above said bottom a distance greater than the depth of said groove, the parts so constructed and arranged that the cradles can be stacked one upon the other and when so stacked the upstanding tongues of each cradle enter and interlock with the grooves in the cradle immediately thereabove whereby each cradle holds the superjacent cradle spaced above its bottom and locks the same against lateral displacement in the stack.

22. Freight transporting apparatus comprising laterally spaced and parallel beams; wheel housings carried by and projecting above said beams; swivel wheels mounted in said housings and supporting said beams; and removable cradle means bridging and supported by the beams, said cradle means having a bottom and frame members depending from the bottom and resting on the beams in such relation to said wheel housings that the latter are nested within said frame members and beneath said bottom.

23. Freight loading and handling apparatus comprising a pair of discrete, laterally spaced and parallel beams; swivel wheels disposed under and supporting said beams adjacent the ends thereof; pallet means mounted on the beams, said pallet means having planar freight-supporting top surfaces and constituting the sole stabilizing and connecting members between said beams; and interlocking means detachably connecting said pallet means to the beams.

24. Freight transporting apparatus comprising laterally spaced and parallel beams; wheel housings carried by and projecting above said beams; swivel wheels mounted in said housings and supporting said beams; removable cradle means bridging and supported by the beams, said cradle means including a bottom having a planar load-supporting top surface and frame members depending from the bottom and resting on the beams in such relation to said wheel housings that the latter are accommodated between said frame members and beneath said bottom; and interlocking means detachably fastening said cradle means to the beams, said cradle means constituting the sole connection between said beams.

MAX B. McKEE.
ADOLPH R. BOHN.

REFERENCES CITED

The following references are of record in the file of this patent:

UNITED STATES PATENTS

| Number | Name | Date |
|---|---|---|
| 765,751 | Ott | July 26, 1904 |
| 780,348 | Jackman | Jan. 17, 1905 |
| 1,010,801 | Rapp | Dec. 5, 1911 |
| 1,099,924 | Johnson | June 16, 1914 |
| 1,156,540 | Marquis | Oct. 12, 1915 |
| 1,383,462 | Gillette | July 5, 1921 |
| 1,605,901 | O'Neil | Nov. 2, 1926 |
| 1,700,843 | Hayward | Feb. 5, 1929 |
| 1,740,014 | Hawkins | Dec. 17, 1929 |
| 1,778,654 | Wright | Oct. 14, 1930 |
| 1,814,252 | Leary | July 14, 1931 |
| 1,830,998 | Harbord | Nov. 10, 1931 |
| 1,940,242 | Burgess | Dec. 19, 1933 |
| 1,942,247 | Johnson | Jan. 2, 1934 |
| 1,966,344 | Hallowell | July 10, 1934 |
| 2,047,954 | Fitch | July 21, 1936 |
| 2,353,017 | Denton | July 4, 1944 |
| 2,370,548 | Kordes | Feb. 27, 1945 |
| 2,430,267 | Arthur | Nov. 4, 1947 |
| 2,485,215 | Rose | Oct. 18, 1949 |

FOREIGN PATENTS

| Number | Country | Date |
|---|---|---|
| 188,785 | Great Britain | Nov. 20, 1922 |
| 422,555 | Great Britain | Aug. 10, 1934 |